United States Patent
Hayman et al.

(10) Patent No.: US 8,539,768 B2
(45) Date of Patent: Sep. 24, 2013

(54) EXHAUST BYPASS SYSTEM FOR TURBOCHARGED ENGINE WITH DEDICATED EXHAUST GAS RECIRCULATION

(75) Inventors: Alan W. Hayman, Romeo, MI (US); Rodney E. Baker, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 209 days.

(21) Appl. No.: 13/104,555

(22) Filed: May 10, 2011

(65) Prior Publication Data

US 2012/0285163 A1    Nov. 15, 2012

(51) Int. Cl.
F02B 33/44 (2006.01)
F02B 47/08 (2006.01)
F02M 25/07 (2006.01)

(52) U.S. Cl.
USPC .. 60/605.2; 60/602; 123/568.12; 123/568.11; 123/568.24

(58) Field of Classification Search
USPC .............. 60/605.2, 602; 123/568.12, 568.11, 123/568.24
IPC ..................................................... F02M 25/07
See application file for complete search history.

(56) References Cited

U.S. PATENT DOCUMENTS

| | | | |
|---|---|---|---|
| 4,131,095 A * | 12/1978 | Ouchi | 123/3 |
| 4,179,892 A * | 12/1979 | Heydrich | 60/605.2 |
| 5,517,976 A * | 5/1996 | Bachle et al. | 60/605.2 |
| 5,682,746 A * | 11/1997 | von Hoerner | 60/605.2 |
| 5,894,726 A * | 4/1999 | Monnier | 123/568.11 |
| 6,009,709 A * | 1/2000 | Bailey | 60/605.2 |
| 6,138,650 A * | 10/2000 | Bailey | 123/568.11 |
| 6,141,959 A * | 11/2000 | Digeser et al. | 60/274 |
| 6,216,461 B1 | 4/2001 | Shao et al. | |
| 6,286,489 B1 * | 9/2001 | Bailey | 123/568.11 |
| 6,543,230 B1 * | 4/2003 | Schmid | 60/605.2 |
| 6,789,531 B1 * | 9/2004 | Remmels | 123/568.11 |
| 6,871,642 B1 * | 3/2005 | Osterwald | 123/568.11 |
| 6,877,492 B1 * | 4/2005 | Osterwald | 123/568.11 |
| 7,043,914 B2 | 5/2006 | Ishikawa | |
| 8,196,403 B2 * | 6/2012 | Hittle et al. | 60/602 |
| 2006/0174621 A1 * | 8/2006 | Chen et al. | 60/612 |
| 2008/0209889 A1 * | 9/2008 | Scheinert | 60/303 |
| 2009/0120087 A1 * | 5/2009 | Sumser et al. | 60/600 |
| 2009/0199825 A1 * | 8/2009 | Piper et al. | 60/605.2 |
| 2009/0308070 A1 | 12/2009 | Alger, II et al. | |
| 2010/0024414 A1 * | 2/2010 | Hittle et al. | 60/602 |
| 2010/0024417 A1 * | 2/2010 | Pierpont et al. | 60/605.2 |
| 2010/0024419 A1 * | 2/2010 | Pierpont et al. | 60/324 |
| 2010/0043429 A1 * | 2/2010 | Wolk et al. | 60/602 |
| 2011/0041495 A1 | 2/2011 | Yager | |

FOREIGN PATENT DOCUMENTS

JP    2004068631 A  *  3/2004

* cited by examiner

*Primary Examiner* — Thai Ba Trieu
(74) *Attorney, Agent, or Firm* — Quinn Law Group, PLLC

(57) ABSTRACT

A turbocharger assembly for an internal combustion engine includes a bypass valve for controlling a flow of exhaust gas from a second group of exhaust ports of a cylinder head assembly. When disposed in an open position, the bypass valve allows exhaust gas from the second group of exhaust ports to combine with exhaust gas from a first group of exhaust ports to spin a turbine of the turbocharger assembly. When disposed in a closed position, the bypass valve forces the exhaust gas from the second group of exhaust ports through an Exhaust Gas Recirculation (EGR) passage to an intake manifold to establish a dedicated EGR system.

19 Claims, 5 Drawing Sheets

EXHAUST BYPASS SYSTEM FOR TURBOCHARGED ENGINE WITH DEDICATED EXHAUST GAS RECIRCULATION

TECHNICAL FIELD

The invention generally relates to an internal combustion engine having a turbocharger assembly and an Exhaust Gas Recirculation system for selectively recirculating exhaust gas from dedicated EGR cylinders of the engine to an intake manifold.

BACKGROUND

Internal combustion engines may re-circulate exhaust gas from one or more dedicated cylinders to an intake manifold, typically referred to as Exhaust Gas Recirculation (EGR), to improve fuel efficiency of the vehicle and/or reduce engine emissions. Additionally, internal combustion engines often include a turbocharger assembly. The turbocharger assembly uses the flow of exhaust gas to spin a turbine, which in turn drives a compressor that compresses the combustion air that is supplied to the intake manifold. When the exhaust gas from a pre-determined number of the cylinders of the internal combustion engine is dedicated to the intake manifold for EGR purposes, thereby bypassing the turbocharger assembly, the flow rate of the exhaust gas available to the turbine of the turbocharger is reduced, which reduces the maximum power output of the internal combustion engine.

SUMMARY

An internal combustion engine for a vehicle is provided. The internal combustion engine includes a cylinder head assembly defining a first group of exhaust ports and a second group of exhaust ports. An exhaust manifold is attached to the cylinder head assembly. The exhaust manifold includes a first group of runners in fluid communication with the first group of exhaust ports. The first group of runners defines a first exit. The first group of runners is configured for directing exhaust gas from the first group of exhaust ports to the first exit. The exhaust manifold further includes a second group of runners in fluid communication with the second group of exhaust ports. The second group of runners defines a second exit. The second group of runners is configured for directing exhaust gas from the second group of exhaust ports to the second exit. The exhaust manifold further includes an EGR bypass passage in fluid communication with the second group of runners and the second exit. The EGR bypass passage defines a bypass exit. The EGR bypass passage is configured for directing exhaust gas from the second group of runners to the bypass exit. The internal combustion engine further includes a turbocharger assembly that is attached to the exhaust manifold. The turbocharger assembly includes a housing that supports a turbine. The housing defines a first inlet in fluid communication with the first exit, and a turbine passage interconnecting the first inlet and the turbine in fluid communication. The turbine passage is configured for directing exhaust gas from the first inlet to the turbine. The housing of the turbocharger assembly further defines a second inlet and a housing bypass passage. The second inlet is in fluid communication with the second exit. The housing bypass passage interconnects the second inlet and the turbine passage in fluid communication. The housing bypass passage is configured for directing exhaust gas from the second inlet to the turbine passage. The turbocharger assembly includes a bypass valve supported by the housing. The bypass valve is disposed within the housing bypass passage. The bypass valve is moveable between an open position and a closed position. When in the open position, the bypass valve is configured for allowing a flow of exhaust gas through the housing bypass passage. When in the closed position, the bypass valve is configured to block the flow of exhaust gas through the housing bypass passage.

An exhaust gas recirculation system for an internal combustion engine is also provided. The exhaust gas recirculation system includes an exhaust manifold. The exhaust manifold includes a first group of runners joining to define a first exit. The first group of runners is configured for directing exhaust gas from a first group of exhaust ports to the first exit. The exhaust manifold further includes a second group of runners joining to define a second exit. The second group of runners is configured for directing exhaust gas from a second group of exhaust ports to the second exit. The exhaust manifold further includes an EGR bypass passage that is in fluid communication with the second group of runners and the second exit. The EGR bypass passage defines a bypass exit. The EGR bypass passage is configured for directing exhaust gas from the second group of runners to the bypass exit. The exhaust gas recirculation system further includes a turbocharger assembly that is attached to the exhaust manifold. The turbocharger assembly includes a housing that supports a turbine. The housing defines a first inlet in fluid communication with the first exit, and a turbine passage interconnecting the first inlet and the turbine in fluid communication. The turbine passage is configured for directing exhaust gas from the first inlet to the turbine. The housing of the turbocharger assembly further defines a second inlet and a housing bypass passage. The second inlet is in fluid communication with the second exit. The housing bypass passage interconnects the second inlet and the turbine passage in fluid communication. The housing bypass passage is configured for directing exhaust gas from the second inlet to the turbine passage. The turbocharger assembly includes a bypass valve that is supported by the housing. The bypass valve is disposed within the housing bypass passage. The bypass valve is moveable between an open position and a closed position. The bypass valve is configured for allowing a flow of exhaust gas through the housing bypass passage when in the open position. The bypass valve is configured to block the flow of exhaust gas through the housing bypass passage when in the closed position. The exhaust gas recirculation system further includes an EGR passage. The EGR passage is attached to the exhaust manifold, and is in fluid communication with the bypass exit. The EGR passage is configured for directing exhaust gas from the bypass exit to an intake manifold. An EGR control valve is disposed within the EGR passage. The EGR control valve is moveable between an open position and a closed position. The EGR control valve is configured to allow a flow of exhaust gas through the EGR passage when in the open position. The EGR control valve is configured to block the flow of exhaust gas through the EGR passage when in the closed position.

A turbocharger assembly for an internal combustion engine of a vehicle is also provided. The turbocharger assembly includes a turbine, and a compressor driven by the turbine. A housing supports the turbine and the compressor. The housing defines a first inlet and a turbine passage. The first inlet is configured for receiving a flow of exhaust gas from a first group of exhaust ports. The turbine passage interconnects the first inlet and the turbine in fluid communication. The turbine passage is configured for directing exhaust gas from the first inlet to the turbine. The housing further defines a second inlet and a housing bypass passage. The second inlet is configured for receiving a flow of exhaust gas from a second group of exhaust ports. The housing bypass passage interconnects the second inlet and the turbine passage in fluid communication. The housing bypass passage is configured for directing exhaust gas from the second inlet to the turbine passage. The turbocharger assembly further includes a bypass valve supported by the housing and disposed within the housing bypass passage. The bypass valve is moveable between an open position and a closed position. The bypass valve is configured for allowing a flow of exhaust gas through the housing bypass passage when in the open position. The bypass valve is configured to block the flow of exhaust gas through the housing bypass passage when in the closed position.

Accordingly, the bypass valve controls the flow of exhaust gas from the second group of exhaust ports to the turbine. When closed, the bypass valve forces the exhaust gas from the second group of exhaust ports through the EGR passage, which directs the exhaust gas to the intake manifold, thereby establishing dedicated EGR cylinders to improve fuel efficiency and reduce engine emissions. When maximum power is required, the bypass valve is opened to allow the exhaust gas from the second group of exhaust ports to also flow into the turbine passage to power the turbine.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, an internal combustion engine is generally shown at 20. The internal combustion engine 20 is for a vehicle, and may include but is not limited to a diesel engine or a gasoline engine. The internal combustion engine 20 depicted in the Figures includes an in-line four cylinder engine. However, it should be appreciated that the internal combustion engine 20 may include any suitable size and/or configuration of engine, including but not limited to an in-line six cylinder engine, a v-style six cylinder engine, or a v-style eight cylinder engine.

Figure 1:
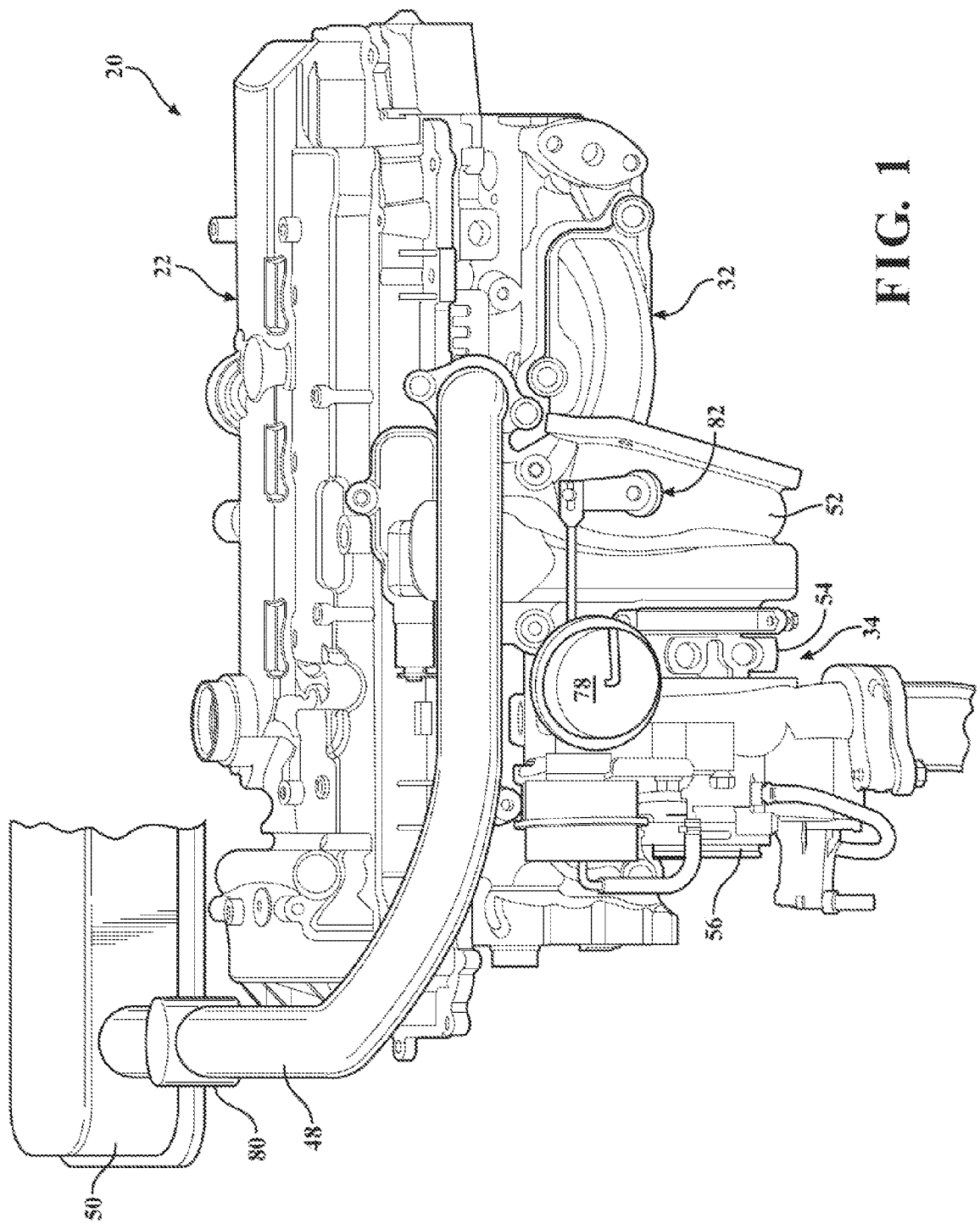
FIG. 1 is a schematic perspective view of an internal combustion engine.
Figure 2:
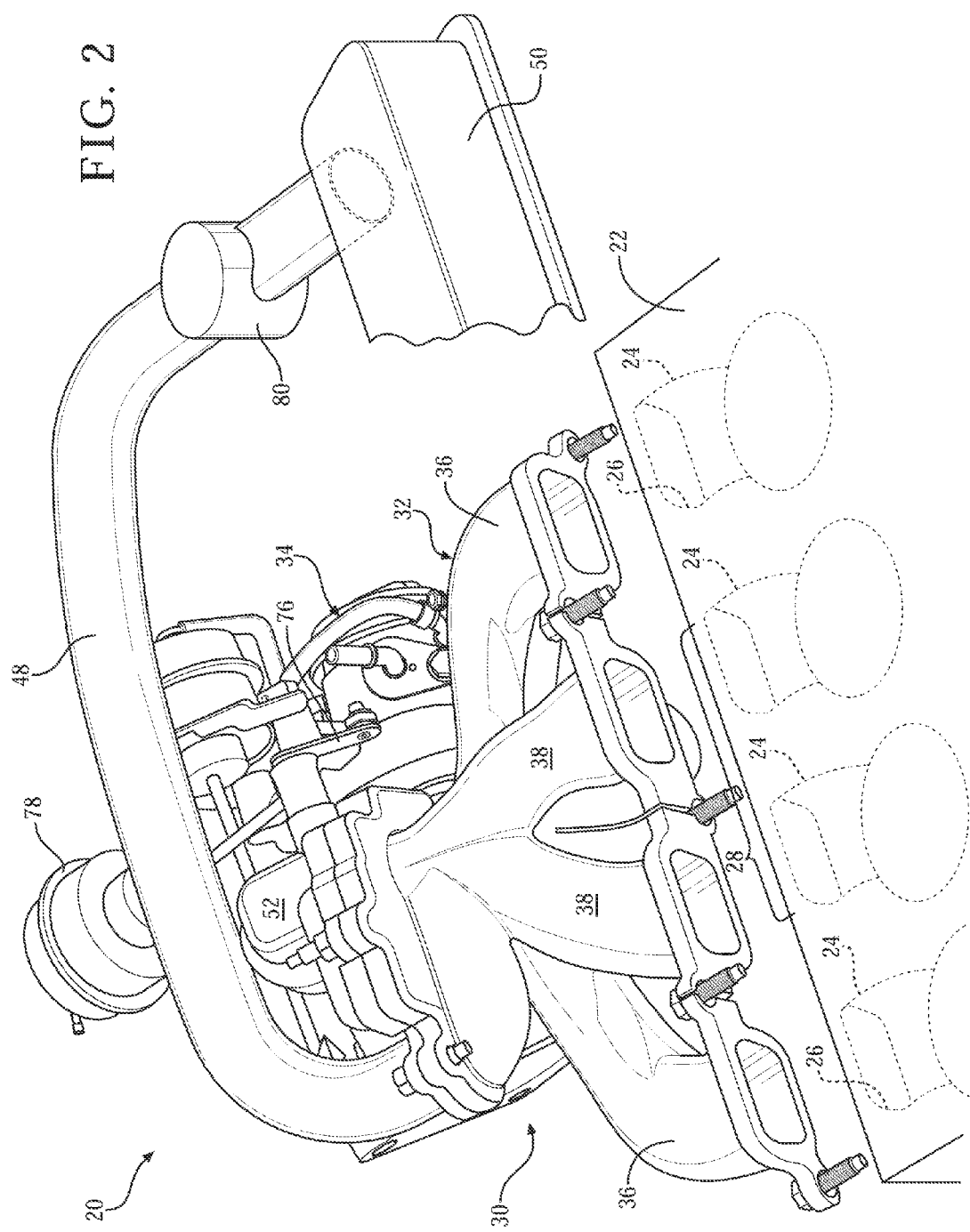
FIG. 2 is a schematic partially exploded perspective view of the internal combustion engine.

Referring to FIGS. 1 and 2, the internal combustion engine 20 includes a cylinder head assembly 22. The cylinder head assembly 22 is attached to a block (not shown). As is known, the block defines a plurality of cylinders. The cylinder head assembly 22 defines a plurality of exhaust ports 24, with one of the exhaust ports 24 in fluid communication with one of the cylinders of the block for discharging exhaust gas after combustion. The plurality of exhaust ports 24 includes a first group of exhaust ports 26 and a second group of exhaust ports 28.

Referring to FIG. 2, the first group of exhaust ports 26 and the second group of exhaust ports 28 may each include a pre-defined number of exhaust ports 24. As the internal combustion depicted in the Figures includes the in-line four cylinder engine, the total number of exhaust ports 24 is equal to four to correspond with the four cylinders of the block. Preferably, the pre-defined number of exhaust ports 24 in the first group of exhaust ports 26 is equal to the pre-defined number of exhaust ports 24 in the second group of exhaust ports 28. As shown, the first group of exhaust ports 26 includes two exhaust ports 24, and the second group of exhaust ports 28 includes two exhaust ports 24. However, the distribution of exhaust ports 24 between the first group of exhaust ports 26 and the second group of exhaust ports 28 may differ from that shown and described herein. For example, the first group of exhaust ports 26 may include one exhaust port 24, and the second group of exhaust ports 28 may include three exhaust ports 24.

The first group of exhaust ports 26 may be referred to as working exhaust ports, as the exhaust gas discharged through the first group of exhaust ports 26 is used to spin a turbine 54 of a turbocharger assembly 34, described in greater detail below. The second group of exhaust ports 28 may be referred to as dedicated Exhaust Gas Recirculation (EGR) exhaust ports, as the exhaust gas discharged through the second group of exhaust ports 28 may be selectively directed to an intake manifold 50 to establish a dedicated EGR system 30 for the internal combustion engine 20, described in greater detail below.

The dedicated EGR system 30 includes an exhaust manifold 32 and the turbocharger assembly 34. The exhaust manifold 32 is attached to the cylinder head assembly 22. The exhaust manifold 32 includes a first group of runners 36 and a second group of runners 38. The first group of runners 36 is in fluid communication with the first group of exhaust ports 26. Each of the first group of runners 36 joins together to define a first exit 40. The first group of runners 36 directs exhaust gas from the first group of exhaust ports 26 to the first exit 40. The second group of runners 38 is in fluid communication with the second group of exhaust ports 28. Each of the second group of runners 38 joins together to define a second exit 42. The second group of runners 38 is configured for directing exhaust gas from the second group of exhaust ports 28 to the second exit 42.

Figure 3:
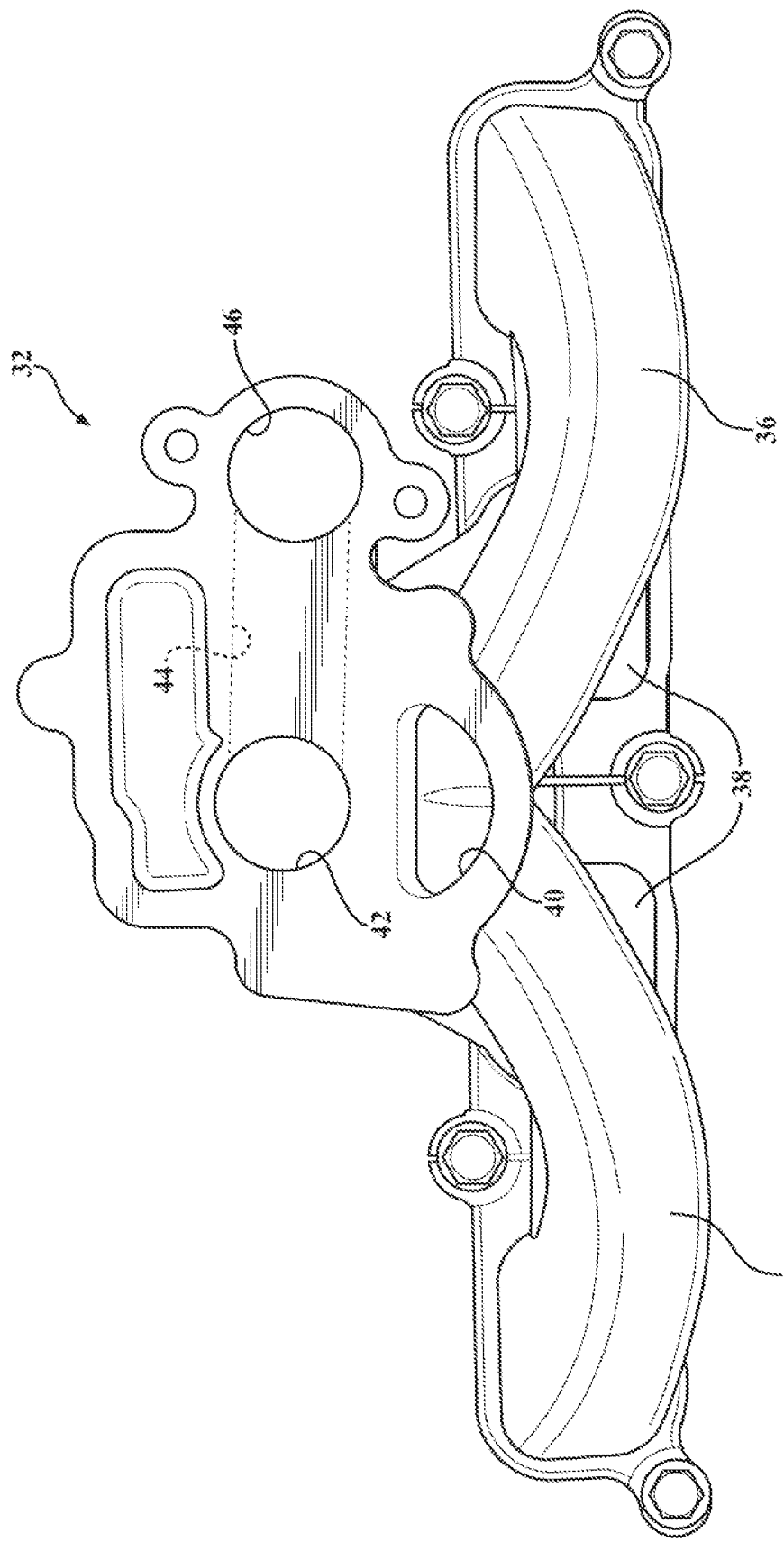
FIG. 3 is a schematic plan view of an exhaust manifold.

Referring to FIG. 3, the exhaust manifold 32 further defines an EGR bypass passage 44. The EGR bypass passage 44 is in fluid communication with the second group of runners 38 and the second exit 42. The EGR bypass passage 44 defines a bypass exit 46 for discharging exhaust gas from the exhaust manifold 32. The EGR bypass passage 44 is configured for directing exhaust gas from the second group of runners 38 to the bypass exit 46.

Referring to FIGS. 2 and 3, the dedicated EGR system 30 further includes an EGR passage 48. The EGR passage 48 is attached to the exhaust manifold 32, and is in fluid communication with the bypass exit 46 of the exhaust manifold 32. The EGR passage 48 is configured for directing exhaust gas from the bypass exit 46 to the intake manifold 50.

Referring to FIG. 1, the turbocharger assembly 34 includes a housing 52, a turbine 54 and a compressor 56. The housing 52 supports the turbine 54 and the compressor 56. The compressor 56 is driven by the turbine 54, and the turbine 54 is driven or spun by a flow of exhaust gas circulating past the turbine 54. The turbine 54 and/or the compressor 56 operate together to compress combustion air for the internal combustion engine 20 as is known in the art. As such, the specific operation of the turbine 54 and/or the compressor 56 is not described in detail herein.

Figure 4:
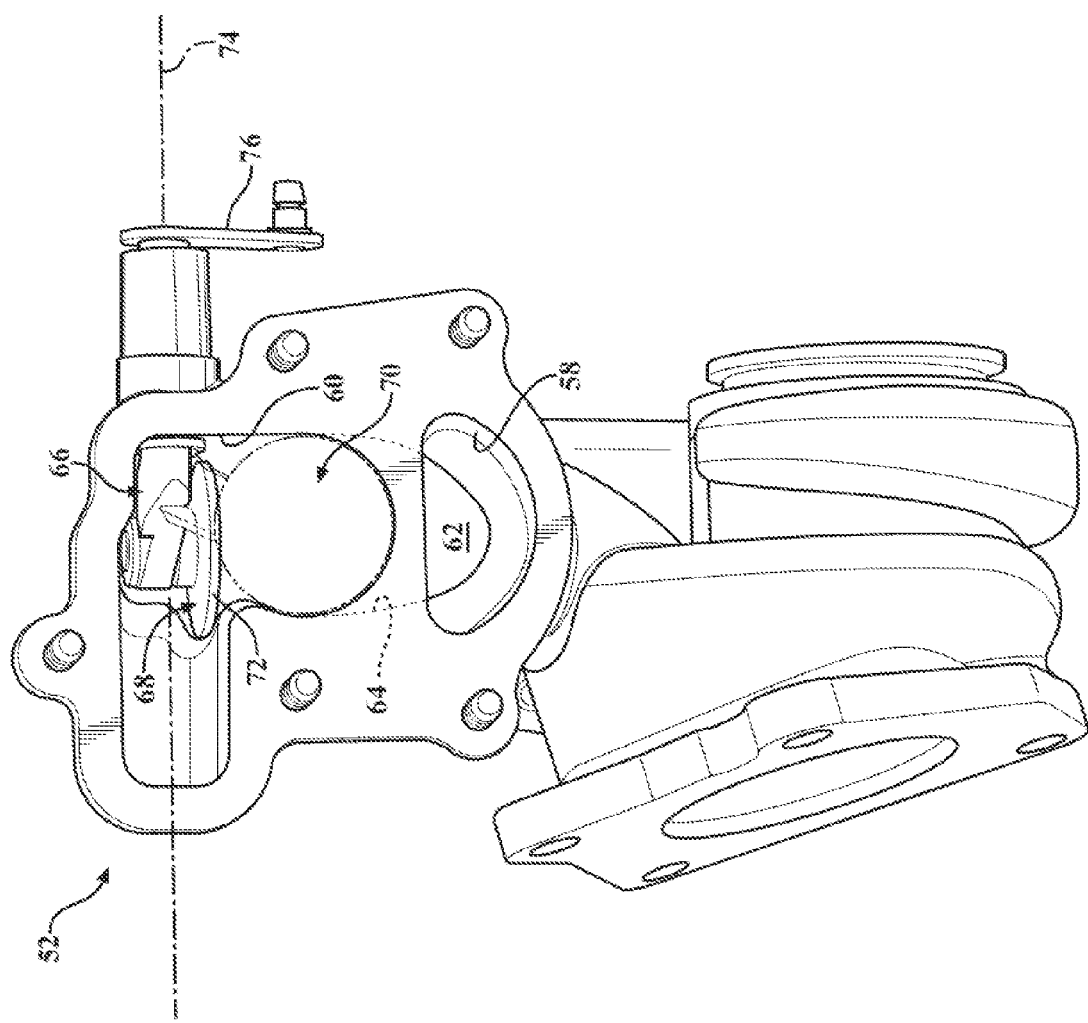
FIG. 4 is a schematic perspective view of a housing of a turbocharger assembly.
Figure 5:
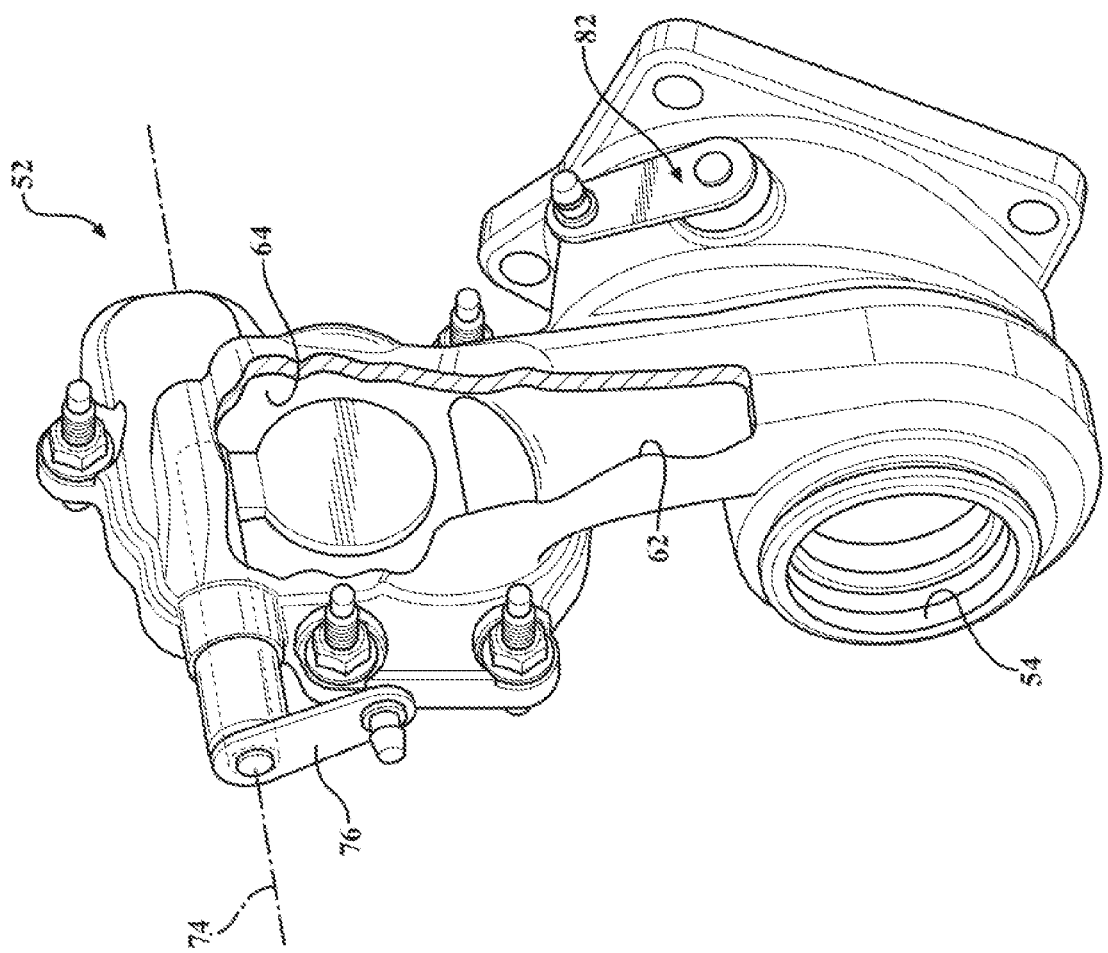
FIG. 5 is a schematic perspective view of the housing of the turbocharger assembly.

Referring to FIGS. 4 and 5, the housing 52 defines a first inlet 58, a second inlet 60, a turbine passage 62 and a housing bypass passage 64. The first inlet 58 is in fluid communication with the first exit 40 of the exhaust manifold 32. The turbine passage 62 interconnects the first inlet 58 and the turbine 54 in fluid communication. The turbine passage 62 directs exhaust gas from the first inlet 58 to the turbine 54. As such, the exhaust gas discharged through the first group of exhaust ports 26 flows through the first group of runners 36, the first exit 40, the first inlet 58, the turbine passage 62, and through the turbine 54 to power the turbine 54. Accordingly, the exhaust gas from the first group of exhaust ports 26 is always available to the turbine 54 to power the turbine 54. The second inlet 60 is in fluid communication with the second exit 42 of the exhaust manifold 32. The housing bypass passage 64 interconnects the second inlet 60 and the turbine passage 62 in fluid communication. The housing bypass passage 64 directs exhaust gas from the second inlet 60 to the turbine passage 62.

The turbocharger assembly 34 further includes a bypass valve 66. The bypass valve 66 is supported by the housing 52, and is disposed within the housing bypass passage 64. The bypass valve 66 is moveable between an open position and a closed position. Referring to FIG. 4, the open position of the bypass valve 66 is shown with solid lines at 68, and the closed position of the bypass 66 valve is shown in phantom at 70. When in the open position, the bypass valve 66 allows a flow of exhaust gas through the housing bypass passage 64 and into the turbine passage 62. Accordingly, when the bypass valve 66 is in the open position, the exhaust gas discharged through the second group of exhaust ports 28 flows through the second group of runners 38, the second exit 42, the second inlet 60, the housing bypass passage 64 and into the turbine passage 62 to power the turbine 54. Therefore, when the bypass valve 66 is disposed in the open position, the exhaust gas from the second group of exhaust ports 28 is made available to power the turbine 54, in addition to the exhaust gas from the first group of exhaust ports 26. When in the closed position, the bypass valve 66 is configured to block the flow of exhaust gas through the housing bypass passage 64, leaving only the exhaust gas from the first group of exhaust ports 26 to power the turbine 54. Blocking the flow of exhaust gas from the second group of exhaust ports 28 from entering the turbine passage 62 forces the exhaust gas from the second group of exhaust ports 28 through the EGR bypass passage 44 defined by the exhaust manifold 32, and through the bypass exit 46 into the EGR passage 48. Accordingly, when the bypass valve 66 is disposed in the closed position, the exhaust gas from the second group of exhaust ports 28 is provided to the intake manifold 50 to establish the dedicated EGR system 30.

As shown, the bypass valve 66 includes a flapper 72 rotatably mounted to the housing 52. The flapper 72 is rotatable about a rotation axis 74 to define the open position and the closed position of the bypass valve 66. A lever 76 is coupled to the flapper 72 to rotate the flapper 72 about the rotation axis 74. An actuator 78, shown in FIGS. 1 and 2, is coupled to the lever 76. The actuator 78 moves the lever 76 to control, i.e., rotate, the flapper 72 between the open position and the closed position. The actuator 78 may include any suitable type and/or style of actuator 78, including but not limited to a vacuum actuator 78, a hydraulic actuator 78, or an electric actuator 78. The actuator 78 provides a liner movement to the lever 76 that is offset from the rotation axis 74, thereby causing the lever 76 to rotate about the rotation axis 74, which in turn rotates the flapper 72. It should be appreciated that the bypass valve 66 may include some other type and/or style of valve not shown or described herein that is capable of opening and closing fluid communication between the second inlet 60 and the turbine passage 62.

As shown in FIGS. 1 and 2, the dedicated EGR system 30 may further include an EGR control valve 80. The EGR control valve 80 is disposed within the EGR passage 48, and is moveable between an open position and a closed position. When in the open position, the EGR control valve 80 is configured to allow a flow of exhaust gas through the EGR passage 48. When in the closed position, the EGR control valve 80 is configured to block the flow of exhaust gas through the EGR passage 48. The EGR control valve 80 works in cooperation with the bypass valve 66 to control the flow of exhaust gas through the dedicated EGR system 30. Accordingly, the EGR control valve 80 is disposed in the open position when the bypass valve 66 is disposed in the closed position so that when the bypass valve 66 is closed to force exhaust gas through the EGR passage 48, the EGR control valve 80 is open to allow the exhaust gas to flow therethrough. The EGR control valve 80 is disposed in the closed position when the bypass valve 66 is disposed in the open position so that when the bypass valve 66 is open to allow exhaust gas to flow into the turbine passage 62, the EGR control valve 80 is closed to prevent the exhaust gas from flowing through the EGR passage 48 and into the intake manifold 50, thereby forcing the exhaust gas through the bypass valve 66 and into the turbine passage 62.

The bypass valve 66 may include a variable intermediate position. The variable intermediate position may include any position of the bypass valve 66 disposed between the open position and the closed position of the bypass valve 66. The variable intermediate position is adjustable to regulate a flow of exhaust gas between both the housing bypass passage 64 and the EGR bypass passage 44. Accordingly, if the bypass valve 66 is positioned in the intermediate position, a portion of the exhaust gas from the first group of exhaust ports 26 is directed into the turbine passage 62 to assist in powering the turbine 54, while the remainder of the exhaust gas from the first group of exhaust ports 26 is directed through the EGR bypass passage 44 to establish the dedicated EGR system 30. The amount of exhaust gas from the first group of exhaust ports 26 directed between the turbine passage 62 and the EGR bypass passage 44 is adjustable by changing the position of the bypass valve 66, i.e., by adjusting the variable intermediate position.

Referring to FIG. 1, the turbocharger assembly 34 may further include a waste gate 82. The waste gate 82 is a valve that is configured for controlling the flow of exhaust gas to the turbine 54. The waste gate 82 operates in a manner that is known to those skilled in the art to control the flow of exhaust gas to the turbine 54. As such, the specific operation of the waste gate 82 is not described in detail herein.

While the best modes for carrying out the invention have been described in detail, those familiar with the art to which this invention relates will recognize various alternative designs and embodiments for practicing the invention within the scope of the appended claims.

The invention claimed is:

1. An exhaust gas recirculation system for an internal combustion engine, the exhaust gas recirculation system comprising:
an exhaust manifold including:
a first group of runners joining to define a first exit and configured for directing exhaust gas from a first group of exhaust ports to the first exit;

a second group of runners joining to define a second exit and configured for directing exhaust gas from a second group of exhaust ports to the second exit; and an EGR bypass passage in fluid communication with the second group of runners and the second exit, and defining a bypass exit, wherein the EGR bypass passage is configured for directing exhaust gas from the second group of runners to the bypass exit;

a turbocharger assembly attached to the exhaust manifold and including a housing supporting a turbine and defining a first inlet in fluid communication with the first exit, and a turbine passage interconnecting the first inlet and the turbine in fluid communication, wherein the turbine passage is configured for directing exhaust gas from the first inlet to the turbine;

wherein the housing of the turbocharger assembly further defines a second inlet in fluid communication with the second exit, and a housing bypass passage interconnecting the second inlet and the turbine passage in fluid communication, wherein only the housing bypass passage connects the second inlet and the turbine passage in fluid communication, and wherein the housing bypass passage is configured for directing exhaust gas from the second inlet to the turbine;

wherein the turbocharger assembly includes a bypass valve supported by the housing and disposed within the housing bypass passage, wherein the bypass valve is moveable between an open position and a closed position, wherein the bypass valve is configured for allowing a flow of exhaust gas through the housing bypass passage when in the open position, and wherein the bypass valve is configured to block the flow of exhaust gas through the housing bypass passage when in the closed position to block the flow of exhaust gas between the second group of exhaust ports and the turbine;

an EGR passage attached to the exhaust manifold and in fluid communication with the bypass exit, wherein the EGR passage is configured for directing exhaust gas from the bypass exit to an intake manifold; and an EGR control valve disposed within the EGR passage and moveable between an open position and a closed position, wherein the EGR control valve is configured to allow a flow of exhaust gas through the EGR passage when in the open position, and wherein the EGR control valve is configured to block the flow of exhaust gas through the EGR passage when in the closed position.

2. The exhaust gas recirculation system as set forth in claim 1 wherein the EGR control valve is disposed in the open position when the bypass valve is disposed in the closed position, and wherein the EGR control valve is disposed in the closed position when the bypass valve is disposed in the open position.

3. The exhaust gas recirculation system as set forth in claim 1 wherein the first group of runners includes a pre-defined number of runners, and the second group of runners includes a pre-defined number of runners, with the pre-defined number of runners of the first group of runners equal to the pre-defined number of runners of the second group of runners.

4. The exhaust gas recirculation system as set forth in claim 3 wherein the pre-defined number of runners of the first group of runners is equal to two (2), and the pre-defined number of runners of the second group of runners is equal to two (2).

5. The exhaust gas recirculation system as set forth in claim 1 wherein the bypass valve includes a variable intermediate position disposed between the open position and the closed position of the bypass valve, wherein the variable intermediate position is adjustable to regulate a flow of exhaust gas between both the housing bypass passage and the EGR bypass passage.

6. The exhaust gas recirculation system as set forth in claim 1 wherein the bypass valve includes a flapper rotatably mounted to the housing and rotatable about a rotation axis between the open position and the closed position of the bypass valve.

7. The exhaust gas recirculation system as set forth in claim 6 wherein the turbocharger assembly includes a lever coupled to the flapper and configured for rotating the flapper about the rotation axis.

8. The exhaust gas recirculation system as set forth in claim 1 wherein the turbocharger assembly further includes a waste gate configured for controlling the flow of exhaust gas to the turbine.

9. An internal combustion engine for a vehicle, the internal combustion engine comprising:
    a cylinder head assembly defining a first group of exhaust ports and a second group of exhaust ports;
    an exhaust manifold attached to the cylinder head assembly, the exhaust manifold including:
        a first group of runners in fluid communication with the first group of exhaust ports and defining a first exit, wherein the first group of runners is configured for directing exhaust gas from the first group of exhaust ports to the first exit;
        a second group of runners in fluid communication with the second group of exhaust ports and defining a second exit, wherein the second group of runners is configured for directing exhaust gas from the second group of exhaust ports to the second exit; and
        an EGR bypass passage in fluid communication with the second group of runners and the second exit, and defining a bypass exit, wherein the EGR bypass passage is configured for directing exhaust gas from the second group of runners to the bypass exit;
    a turbocharger assembly attached to the exhaust manifold and including a housing supporting a turbine and defining a first inlet in fluid communication with the first exit and a turbine passage interconnecting the first inlet and the turbine in fluid communication, wherein the turbine passage is configured for directing exhaust gas from the first inlet to the turbine;
    wherein the housing of the turbocharger assembly further defines a second inlet in fluid communication with the second exit, and a housing bypass passage interconnecting the second inlet and the turbine passage in fluid communication, wherein only the housing bypass passage connects the second inlet and the turbine passage in fluid communication, and wherein the housing bypass passage is configured for directing exhaust gas from the second inlet to the turbine; and
    wherein the turbocharger assembly includes a bypass valve supported by the housing and disposed within the housing bypass passage, wherein the bypass valve is moveable between an open position and a closed position, wherein the bypass valve is configured for allowing a flow of exhaust gas through the housing bypass passage when in the open position, and wherein the bypass valve is configured to block the flow of exhaust gas through the housing bypass passage when in the closed position to block the flow of exhaust gas between the second group of exhaust ports and the turbine.

10. The internal combustion engine as set forth in claim 9 wherein the first group of exhaust ports includes a pre-defined number of exhaust ports, and the second group of exhaust ports includes a pre-defined number of exhaust ports, with the pre-defined number of exhaust ports of the first group of exhaust ports is equal to the pre-defined number of exhaust ports of the second group of exhaust ports.

11. The internal combustion engine as set forth in claim 10 wherein the pre-defined number of exhaust ports of the first group of exhaust ports is equal to two (2), and the pre-defined number of exhaust ports of the second group of exhaust ports is equal to two (2).

12. The internal combustion engine as set forth in claim 9 further comprising an EGR passage attached to the exhaust manifold and in fluid communication with the bypass exit, wherein the EGR passage is configured for directing exhaust gas from the bypass exit to an intake manifold.

13. The internal combustion engine as set forth in claim 12 further comprising an EGR control valve disposed within the EGR passage and moveable between an open position and a closed position, wherein the EGR control valve is configured to allow a flow of exhaust gas through the EGR passage when in the open position, and wherein the EGR control valve is configured to block the flow of exhaust gas through the EGR passage when in the closed position.

14. The internal combustion engine as set forth in claim 13 wherein the EGR control valve is disposed in the open position when the bypass valve is disposed in the closed position, and wherein the EGR control valve is disposed in the closed position when the bypass valve is disposed in the open position.

15. The internal combustion engine as set forth in claim 9 wherein the bypass valve includes a variable intermediate position disposed between the open position and the closed position of the bypass valve, wherein the variable intermediate position is adjustable to regulate a flow of exhaust gas between both the housing bypass passage and the EGR bypass passage.

16. The internal combustion engine as set forth in claim 9 wherein the bypass valve includes a flapper rotatably mounted to the housing and rotatable about a rotation axis between the open position and the closed position of the bypass valve.

17. The internal combustion engine as set forth in claim 16 wherein the turbocharger assembly includes a lever coupled to the flapper and configured for rotating the flapper about the rotation axis.

18. The internal combustion engine as set forth in claim 17 further comprising an actuator coupled to the lever and configured for moving the lever to control the flapper.

19. The internal combustion engine as set forth in claim 9 wherein the turbocharger assembly further includes a waste gate configured for controlling the flow of exhaust gas to the turbine.

* * * * *